O. E. BRAUN.
VEHICLE LOCK.
APPLICATION FILED APR. 17, 1915.
1,158,891.
Patented Nov. 2, 1915.
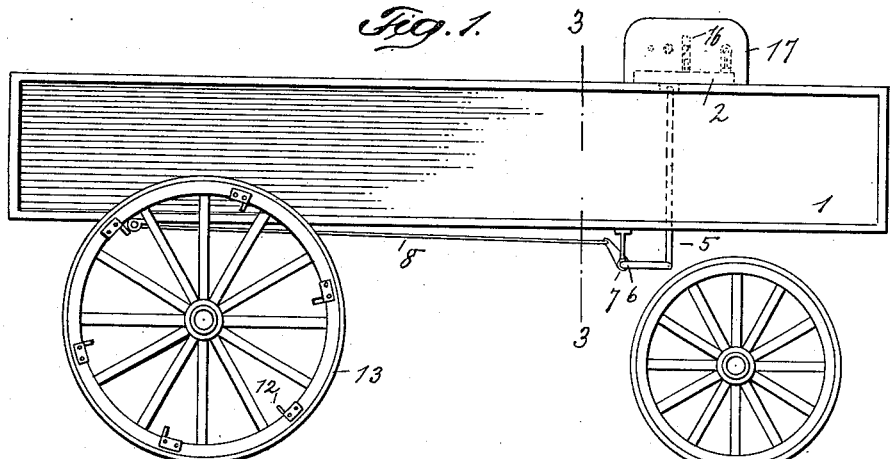
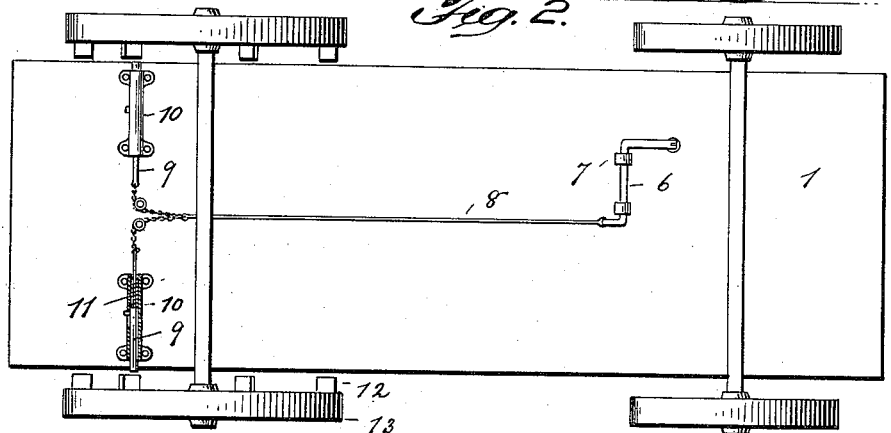
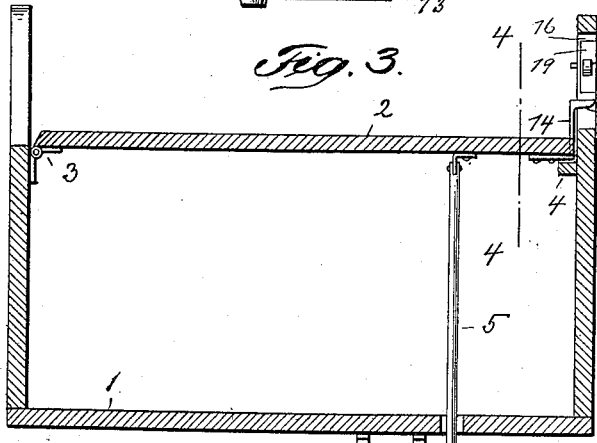
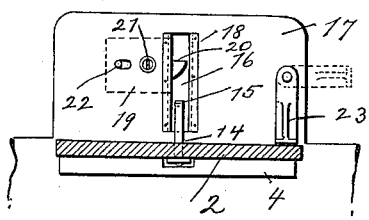
INVENTOR
Otto E. Braun
BY
Briesen & Jumpe
ATTORNEYS.

UNITED STATES PATENT OFFICE.

OTTO E. BRAUN, OF BROOKLYN, NEW YORK.

VEHICLE-LOCK.

1,158,891. Specification of Letters Patent. Patented Nov. 2, 1915.

Application filed April 17, 1915. Serial No. 21,974.

*To all whom it may concern:*

Be it known that I, OTTO E. BRAUN, a citizen of the United States, and a resident of Brooklyn, in the county of Kings and State of New York, have invented certain new and useful Improvements in Vehicle-Locks, of which the following is a specification.

This invention relates to a lock for vehicles which operates automatically as soon as the driver rises from his seat, so that in this way the vehicle cannot be moved or stolen while the driver makes collections and deliveries or is temporarily absent for other purposes.

In the accompanying drawing: Figure 1 is a side elevation of a vehicle provided with a lock embodying my invention; Fig. 2 a bottom view partly in section thereof; Fig. 3 a vertical cross section on line 3—3 Fig. 1 and Fig. 4 a section on line 4—4 Fig. 3.

The body 1 of a wagon is provided with a driver's seat 2, which is hinged at one of its ends as at 3. The other or free end of seat 2 is adapted to be supported in a horizontal position upon a rail 4, projecting from the body of the wagon. Seat 2 is connected to a wheel-locking device of suitable construction, which is so constituted that when the seat is held down by the weight of the driver, the locking bolt is withdrawn from the wheel, while when the seat rises upon its relinquishment by the driver, such bolt is shot into engagement with the wheel. As shown, there depends from seat 2, a rod 5 pivoted to a cranked shaft 6, which is hung in bearings 7. This shaft by cables 8 is connected to bolts 9 sliding in housings 10, and influenced by springs 11. When the seat is held down, springs 11 are compressed and the bolts retracted. When the seat is vacated, springs 11 will shoot bolts 9 into engagement with stops 12 of wheels 13, and by thus exercising a pull on cables 8, will tilt seat 2 upward.

Means are provided for bringing the seat during its upward tilting movement into automatic engagement with a locking device whereby the seat becomes held in its raised position until released. But as the wheel locking bolts are operatively connected to the seat, they will likewise become locked, so that the wagon cannot be moved until the seat is first unlocked and is then lowered.

The means for locking the seat are as follows: To the free end of seat 2, there is attached a catch 14, provided with a laterally extending nose 15. This nose enters an upright groove or guideway 16, formed in the side rest or fixed member 17 of the body, and reinforced by edgings 18. Within a mortise of side rest 17 is sunk a lock case 19, the spring-bolt or latch 20 of which has a beveled lower edge, and is adapted to be shot across groove 16. When the seat becomes vacated, it will be tilted upward by springs 11 as previously described, and in this way nose 15, will rise in groove 16, and strike lower bevel of latch 20. In this way the latch will be momentarily retracted to permit the passage of the nose into the upper part of the groove, above the latch, while the latter will be again shot across the groove, as soon as it has been cleared by the nose. The catch 14 being thus locked within the top of groove 16, locks the seat 2 in its tilted position, so that the wheels cannot be turned until the catch is released. This release of the catch can only be effected by means of a key carried by the driver or other authorized person, and adapted to be inserted into the key hole of a barrel 21, exposed on the inner face of side rest 17. On this inner face is also exposed a pusher 22 by means of which the latch may be held either in its advanced or retracted position.

In order to permit the driver to throw the locking mechanism out of action, there is pivoted to side rest 17, a stop 23, which when swung down locks the seat in its horizontal position, and thus prevents it from rising upon being vacated.

It will be seen that by the construction described, the wheels will become automatically locked whenever the seat is unoccupied so that the wagon cannot be moved when unattended. Thus an effective check is furnished against the theft of delivery and similar wagons, which are frequently left out of sight of the driver.

I claim:

1. A vehicle lock comprising a tiltable spring-influenced seat, wheel-locking means operatively connected thereto, a catch on the seat, a fixed member having a groove adapted to be engaged by said catch, and a latch adapted to be projected across said groove.

2. A vehicle lock comprising a tiltable spring-influenced seat, wheel-locking means operatively connected thereto, a catch on the seat, a side rest having a groove adapted to be engaged by said catch, a latch adapted to be projected across said groove and having a lower beveled edge adapted to be operatively engaged by the catch, and means for locking the latch.

OTTO E. BRAUN.

Copies of this patent may be obtained for five cents each, by addressing the "Commissioner of Patents, Washington, D. C."